United States Patent [19]

Wood et al.

[11] 4,321,784
[45] Mar. 30, 1982

[54] HEIGHT OF CUT ADJUSTMENT

[75] Inventors: William D. Wood, Maple Lake; Gary R. Lamusga, Prior Lake, both of Minn.

[73] Assignee: The Toro Company, Minneapolis, Minn.

[21] Appl. No.: 169,064

[22] Filed: Jul. 15, 1980

[51] Int. Cl.³ ...................... A01D 53/00; A01D 53/08
[52] U.S. Cl. .................................. 56/17.2; 280/43.13
[58] Field of Search ...................... 56/17.2; 280/43.13, 280/43.17, 43.19

[56] References Cited

U.S. PATENT DOCUMENTS

| | | | |
|---|---|---|---|
| 2,848,859 | 8/1958 | Abel | 56/17.2 |
| 2,945,338 | 7/1960 | Burrows et al. | 56/17.2 |
| 3,217,474 | 11/1965 | Neilson | 56/17.2 |
| 3,357,715 | 12/1967 | Plamper et al. | 380/43.13 |
| 3,677,574 | 7/1972 | Cyr | 280/43.13 |
| 4,167,093 | 9/1979 | Pfieffer et al. | 56/17.2 |

FOREIGN PATENT DOCUMENTS 230223 8/1959 Australia .............................. 56/17.2

OTHER PUBLICATIONS

Toro Mulcher, Model 18085, The Toro Co., Jul. 1979.
Victa Mustang, Brochure from Victa, 6-78.

Primary Examiner—Paul J. Hirsch
Attorney, Agent, or Firm—James W. Miller

[57] ABSTRACT

A lawn mower (2) is moveably supported by wheels (14) and (16). Wheels (14) and (16) are eccentrically mounted on front and rear link members (24) and (28) which are respectively joined together in pairs by through axles (30). Two flexible cables (32) and (34) transmit this rotation from one front link member (24) to one rear link member (28). One of the link members (24) and (28) is coupled by a flexible cable (80) to a selectively operable control (60) for effecting manual rotation of all of the link members (24) and (28). This effects a change in the height of the wheels (14) and (16) relative to housing (4) simultaneously.

10 Claims, 4 Drawing Figures

HEIGHT OF CUT ADJUSTMENT

TECHNICAL FIELD

This invention relates to a height of cut adjustment for lawn mowers or similar devices used for cutting grass or other vegetation. More particularly, this invention relates to an improved lawn mower having a plurality of ground engaging wheels for rollably supporting the lawn mower for movement over a ground surface. A single control is used by the operator to simultaneously adjust the level of all four wheels relative to the housing to effect a height of cut adjustment.

BACKGROUND OF THE INVENTION

Powered lawn mowers are well known. Such mowers usually comprise a deck or housing that contains a vegetation cutting element. This element may either be a rigid steel blade, a flexible mono-filament line, or some other type of cutting means. The cutting element is powered by any suitable prime mover. This element usually rotates in a cutting plane to sever the grass particles at a pre-determined height above the ground. When the position of the cutting element is vertically fixed relative to the housing, the height of cut is dependent upon the height of the housing above the ground.

Lawn mowers of this type usually include a plurality of wheels for rollably supporting the housing for movement over the ground surface. These wheels are sometimes self-propelled to assist the operator in propelling the lawn mower over the ground. The wheels are usually vertically adjustable in height relative to the housing to allow different elevations of the housing above the ground. This changes the height of cut and is desirable since different heights of cut may be required by different grass and/or weather conditions. For example, in extremely hot weather, one wishes to leave the grass longer than one would if the weather were somewhat cooler to avoid burning the grass out. This would be impossible if the mower did not have different heights of cut available.

In many lawn mowers of this type, each of the wheels is individually adjustable, Many times the wheel is rotatably supported on the housing by an eccentric link member. This link member can be rotated between different positions to effect a change in the height of the wheel relative to the housing. A locking mechanism is provided for each link member to hold the link member in any adjusted position. Since each wheel must be individually adjusted to change the height of cut, it is burdensome and somewhat time-consuming to effect such a change.

Certain lawn mowers have been known which effect the change in wheel height on all the wheels simultaneously. In such mowers, the eccentric link members for the rear wheels are mounted on through axles or shafts. In addition, a rigid adjustment bar or shaft extends between one of the front link members and one of the rear link members. Thus, one only has to adjust or rotate one of the link members to effect rotation of all four link members since the link members are rotatably joined by the axles and adjustment bar.

While the system just noted effects the height of cut adjustment with only one adjusting movement, it has certain disadvantages. For example, the use of a rigid bar does not lend itself to housing configurations which are unusual, but instead is best used with housings having straight sides or a flat deck. In such a housing the bar can easily pass between the front and rear link members without having to bend or be distorted in shape too greatly. Accordingly, design flexibility for the deck housing is lost using a rigid adjustment bar. In addition, there is no easy way to adjust the rigid bar configuration so that a tilt or angle can be put onto the deck housing between the front and rear wheels. Such an angle has to be preset according to the points at which the rigid adjustment bar attaches to the link members. There has not been any way to easily change this angle in the devices of the prior art to the best of applicants' knowledge.

SUMMARY OF THE INVENTION

This invention relates to a lawn mower having a height of cut adjustment in which all four wheels can be adjusted in height relative to the housing simultaneously and which does not have the disadvantages of prior art systems. The lawn mower of this invention has a height of cut adjustment which does not limit housing configuration and which can be easily adjusted to provide a tilt or angle on the housing between the front and rear wheels.

One aspect of this invention is a lawn mower for cutting grass or other vegetation that comprises a housing having front and rear sides. A plurality of rotatable front and rear ground engaging wheels are carried on the housing with each wheel being adjacent the corner of the housing. Means is carried on the housing for cutting vegetation at a pre-determined height above the ground. This invention particularly relates to a means for adjusting the height of cut. This adjusting means comprises a link member rotatably carried on the housing adjacent to each corner thereof for rotation about an axis of rotation that is fixed relative to the housing. Means is provided for rotatably coupling the link members adjacent the front side of the housing in a first pair and the link members adjacent the rear side of the housing in a second pair for joint rotation. Means is also provided for rotatably supporting each of the wheels on one of the link members eccentrically offset from the axis of rotation of the link member such that rotation of the link member varies the position of the attached ground engaging wheel with respect to the housing for varying the height of the housing above the ground surface. Means is provided for rotating a selected one of the link members about its axis of rotation. Finally, means is provided for transmitting rotation from the first to the second pair of link members so that rotation of the selected one link member will effect simultaneous rotation of all of the link members. This motion transmitting means comprises two flexible cables extending between and attached to one of the link members in the first pair and one of the link members in the second pair.

BRIEF DESCRIPTION

The present invention will be described hereafter in the detailed description, taken in conjunction with the following drawings, in which like reference numerals refer to like elements throughout.

DETAILED DESCRIPTION

Figure 1:
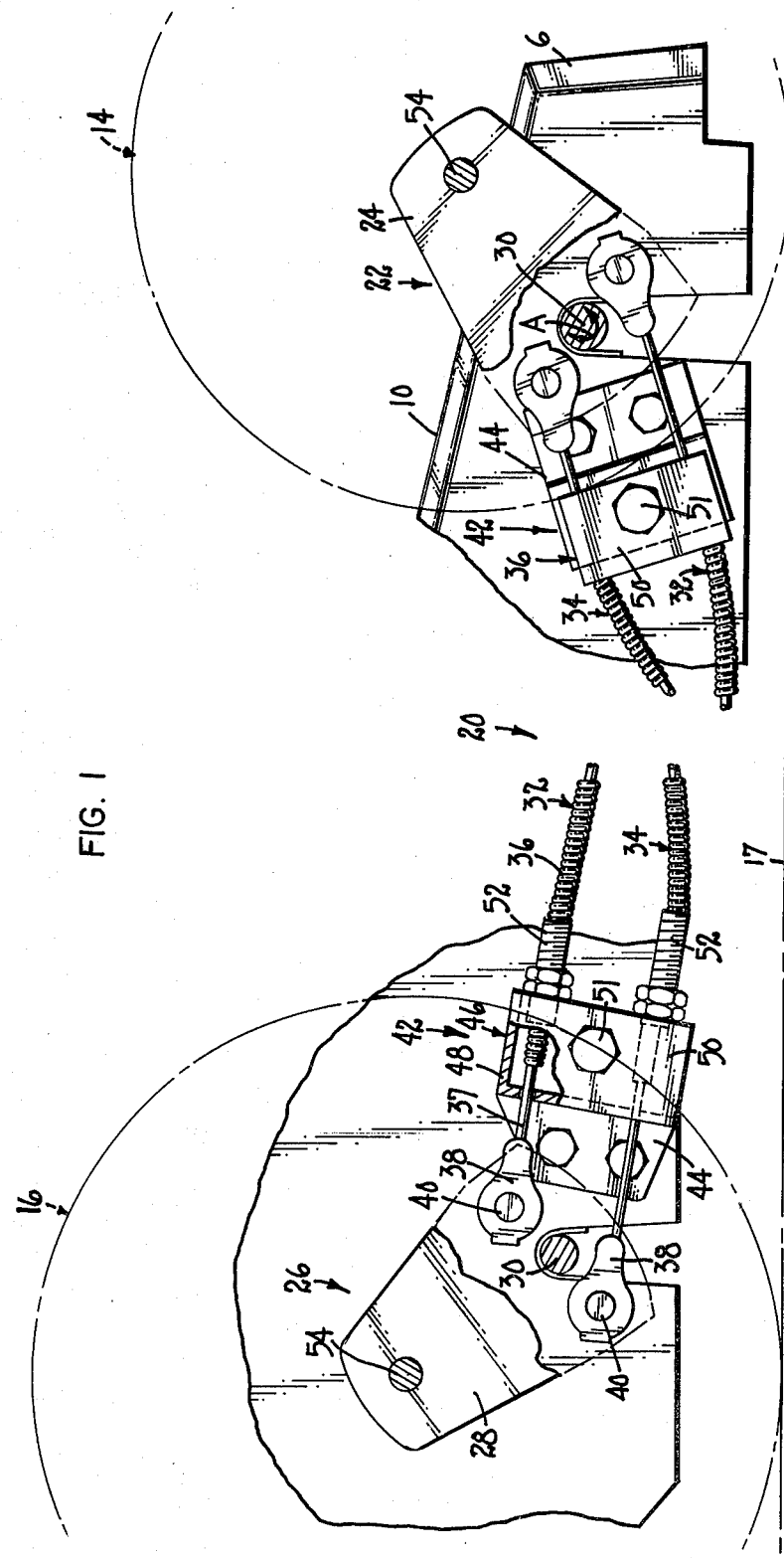
FIG. 1 is a side elevational view of a right side of the housing of an improved lawn mower according to this invention, particularly illustrating the two cables used as part of the height of cut adjustment means of the present invention with a portion of the mower housing removed for clarity.

An improved lawn mower according to this invention is generally identified as 2. Lawn mower 2 comprises a housing 4 having front and rear sides 6 and 8. Housing 4 also includes a top deck or top wall 10. Top deck 10 mounts any suitable prime mover 12. Prime mover 12 may either be an internal combustion engine or an electric motor.

Prime mover 12 includes a downwardly extending drive shaft (not shown). This drive shaft extends down through top deck 10 and terminates in a cutting chamber formed on the underside of housing 4. A cutting element, such as a rigid steel blade or mono-filament line, is coupled to the drive shaft to rotate therewith. Such a cutting element will sever grass particles or other vegetation at a pre-determined height above the ground. This height is referred to as the height of cut.

Lawn mower 2 includes a means for movably supporting housing 4 for movement over the ground 17. This support means comprises two front wheels 14 and two rear wheels 16. The front and rear wheels 14 and 16 are respectively located adjacent each corner of housing 4. Wheels 14 and 16 may be of any construction as long as they are rotatable to rollably support housing 4 above the ground 17. Accordingly, wheels 14 and 16 may be constructed in the manners generally known for lawn mower wheels of this type.

This invention relates particularly to a means of adjusting the height of cut identified generally as 20 herein. Adjusting means 20 more particularly provides a means for simultaneously changing the vertical height of wheels 14 and 16 relative to housing 4. The cutting element is vertically fixed relative to housing 4 and wheels 14 and 16 must always roll on the ground 17. Thus, any attempt to change the height of wheels 14 and 16 relative to housing 4 will, in effect, change the height of the housing 4 relative to the ground 17.

Adjusting means 20 comprises a first pair 22 of front link members 24 and a second pair 26 of rear link members 28. Link members 24 and 28 are generally identical and comprise trapezoidal shaped members. Each of the front link members 24 is located adjacent one of the front corners of housing 4 and the rear link members 28 are similarly located adjacent each of the rear corners of housing 4.

Front link members 24 are joined together for simultaneous rotation by a through axle or shaft 30. A similar through axle 30 rotatably joins the rear link members 28. Axles 30 are preferably welded or otherwise fixedly secured to link members 24 and 28. Moreover, axles 30 are supported for rotation in any suitable manner by housing 4. The rotation of axles 30 is illustrated by arrows A. Thus, each axle 30 defines a substantially horizontal axis of rotation for the front and rear link members 24 and 28. Rear link members 28 are oppositely slanted or disposed as opposed to the slant given to front link members 24. For example, rear link members 28 slant toward the front side 6 of housing 4 while front link members 24 slant toward the rear side of 8 of housing 4.

A motion transmitting means extends between one front link member 24 and one rear link member 28 along either the left or right side of housing 4. This motion transmitting means comprises first and second cables 32 and 34. Cables 32 and 34 are generally identical. They each comprise an outer sheath 36 and an inner line 37 contained inside and slidable relative to outer sheath 36. Preferably, outer sheath 36 includes a polyethylene liner for easing movement of inner line 37 in sheath 36. Each of the outer ends of the inner line 37 is provided with an eyelet or attachment member 38. As seen in the drawings, cables 32 and 34 run along the side of housing 4 beneath the level of top deck 10. A cover plate can cover and protect cables 32 and 34.

Outwardly extending pivot pins 40 are provided on the link members 24 and 28 to which the cables 32 and 34 are attached. Each eyelet 38 of the inner line 37 is pivotally received on and secured in any suitable manner to one pin 40. In addition, a clamping means 42 is fixedly secured to housing 4 adjacent the front side 6 and rear side 8 for fixedly clamping the ends of each outer sheath 36 relative to housing 4. Each clamping means 42 comprises a block 44 fixedly secured by bolts or the like to housing 4. Block 44 mounts a two-part clamping member 46 having a bearing member 48 which defines channels into which the outer ends of the sheaths 36 are placed. A cover plate 50 covers these channels and is secured to the bearing member 48 by a bolt 51 or the like for firmly clamping the outer sheaths 36 therebetween inside the channels. One end of one of the outer sheaths 36 is provided with a nut adjuster 52 at its point of attachment to clamping means 42. The other sheath 36 of the other cable could also be provided with a nut adjuster 52 on one end if so desired. Nut adjuster 52 is any conventional type of adjuster that allows the outer end of sheath 36 to be either drawn into or moved outwardly of clamping means 42 for a purpose to be discussed hereafter. When nut adjuster 52 is fixed, however, then the end of sheath 36 is fixed relative to housing 4 like the other ends of sheaths 36.

Each of the link members 24 and 28 rotatably support one of the ground engaging wheels 14 and 16. Each wheel 14 and 16 has a laterally projecting stub shaft 54 or the like. Stub shaft 54 is pivotally journalled in the link members 24 and 28. Each stub shaft 54 is eccentrically offset in link member 24 and 28 from the axis of rotation of link member 24 and 28 defined by axle 30. In addition, pins 40 which journal or secure the inner lines 37 to the link members are located respectively on either side of a straight line extending between the stub shaft 54 of the ground engaging wheel 14 or 16 and the axis of rotation of the link member.

One selected link member 24 or 28 is connected to a means 56 for rotating that link member about its axis of rotation. Preferably, the selected link member is the rear link member 28 on the side of housing 4 opposite to cables 32 and 34. Lawn mower 2 includes an upwardly extending U-shaped handle 58. Handle 58 is used by an operator who walks behind the lawn mower 2 for pushing the lawn mower in a forward direction. Rotating means 56 comprises a suitable control 60 mounted on handle 58 so as to be operable by the operator who is normally standing behind handle 58.

Control 60 includes a pivotal lever 62, a hand grip 64, and a push button 66. The push button 66 must be pushed inwardly to unlock a locking pin 68. Pin 68 is selectively receivable in one of the projections 70 of a locking slot 72 that is fixed relative to lever 62. After pin 68 is pushed out of one projection 70 and into slot 72, the lever 62 can then be pivoted about its pivot axis 74. Then, pin 68 can be aligned with another projection 70 of slot 72. When button 66 is released, a spring 76 causes pin 68 to be received in the newly selected projection 70 to relock lever 62.

Figure 2:
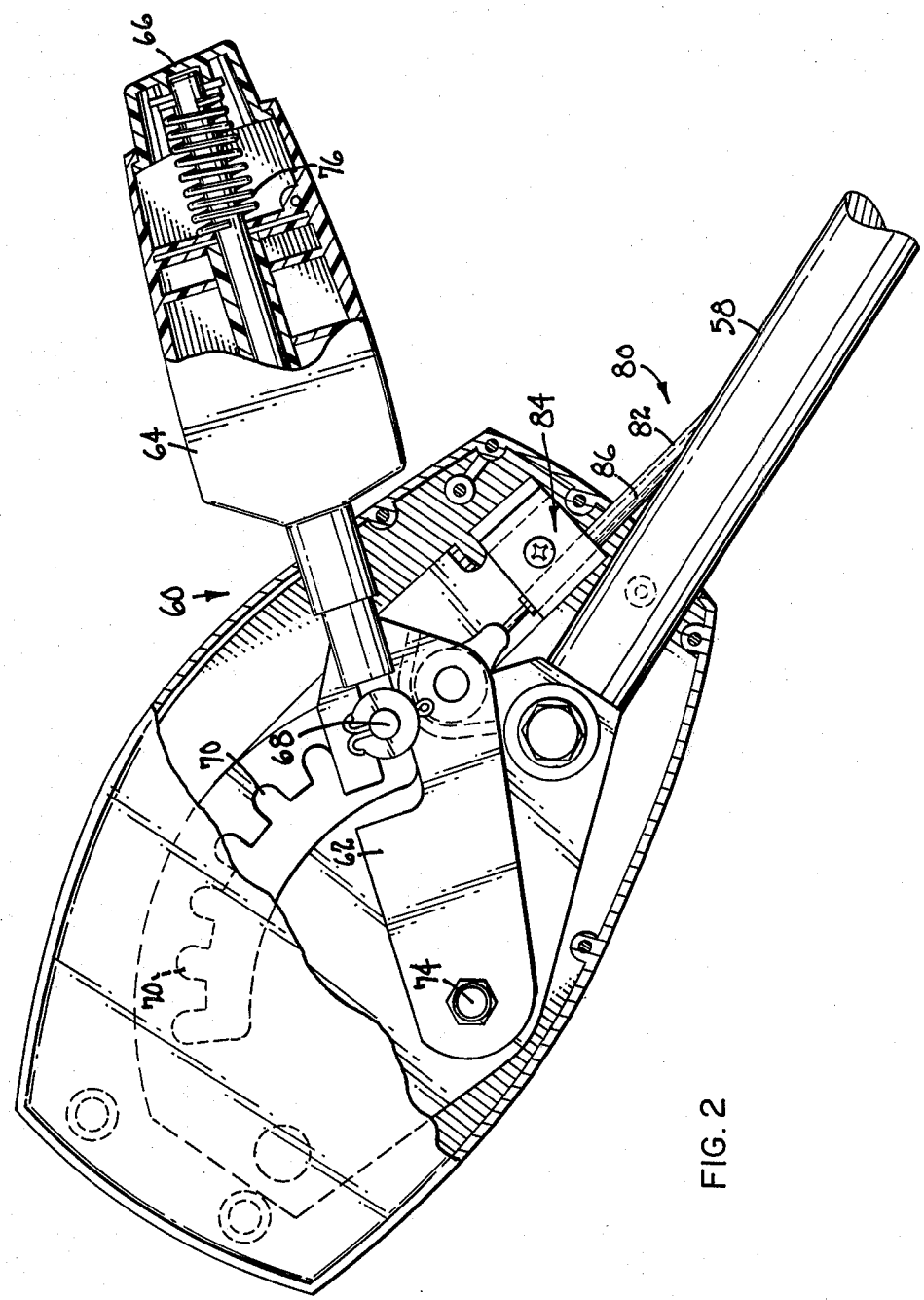
FIG. 2 is a side elevational view, partly broken away and shown in cross section, of a control mounted on the handle of the lawn mower according to this invention, which control is used for actuating the height of cut adjustment means of this invention.
Figure 3:
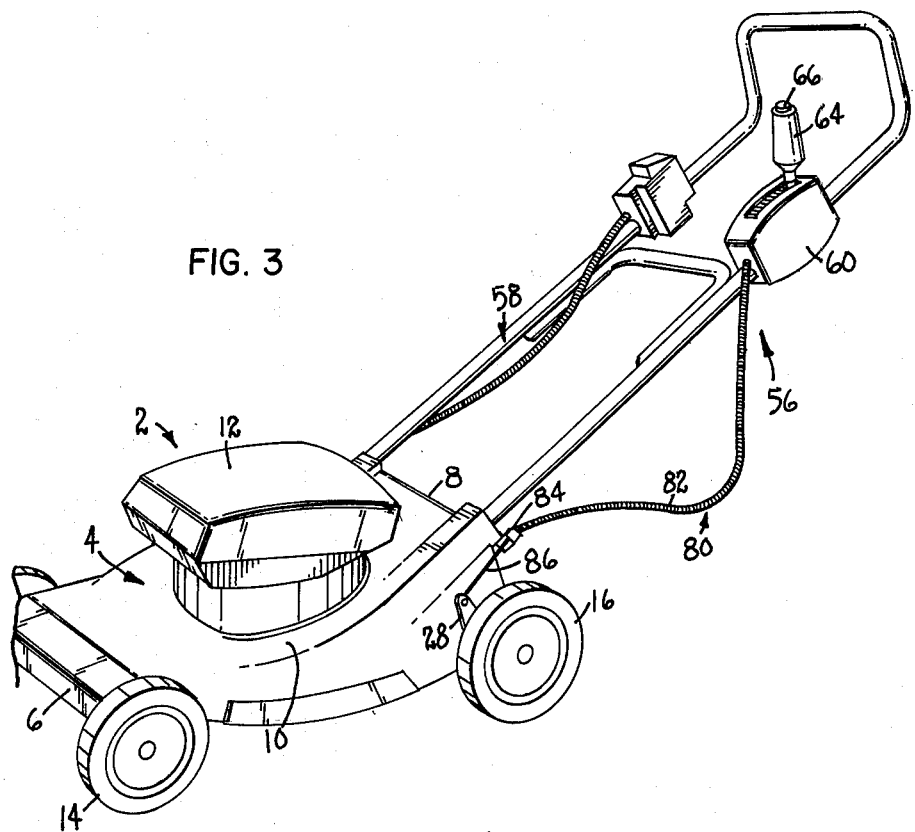
FIG. 3 is a perspective view of a lawn mower according to this invention particularly illustrating the control of FIG. 2.
Figure 4:
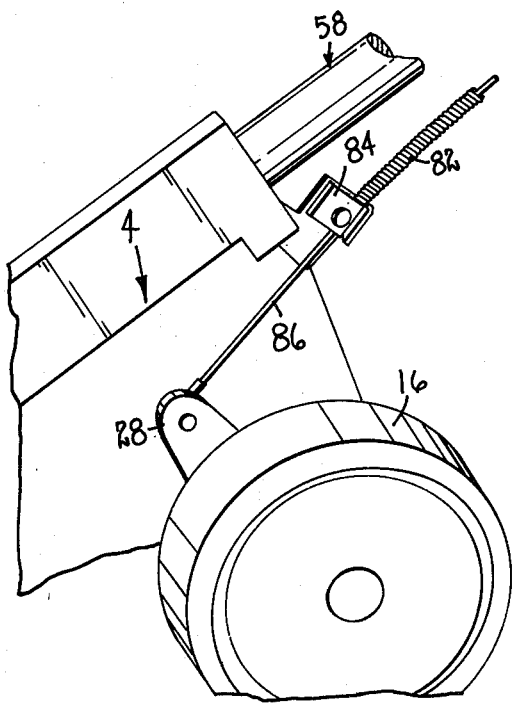
FIG. 4 is a partial perspective view of a lawn mower according to this invention, particularly illustrating the attachment of the control cable from the control shown in FIG. 2 to one of the rear link members of the height of cut adjustment means.

A flexible cable 80 extends between the end of pivotal lever 62 and the selected link arm 28 to transmit the motion of lever 62 thereto. Preferably, cable 80 comprises an outer sheath 82 which has its ends fixed at the top and at the bottom in any suitable clamping means 84. An inner line 86 slides through the outer sheath 80 and has one of its ends pivotally journalled to the end of pivotal lever 62 and the other of its ends pivotally secured to the outer end of the selected link arm 28. For example, the ends of line 86 can be provided with eyelets (similar to eyelets 38) which may be pivotally received on pins carried on the lever 62 and the selected link arm 28. See FIGS. 2 and 4 for the attachment of line 86 to lever 62 and link arm 28. Use of this double type cable 80 is preferred since the only way to effect rotation of the link arm 28 is to move the inner line 86. This can be done only by a positive rotation of lever 62. Thus, a forward motion of handle 58, e.g. as when handle 58 is folded, does not cause any change in the height of cut even though cable 80 is bent since lever 62 has not pivoted.

In operation of lawn mower 2 according to this invention, all that is required to change the height of cut is for the operator to pivot the lever 62 of control 60 from one position to another. This effects a rotation of the link member 28 to which cable 80 has inner line 86 attached. Rotation of this link member 28 effects a simultaneous rotation of all the other link members 24 and 28 through the axles 30 and motion transmitting means defined by cables 32 and 34. One of the cables 32 and 34 will effect the motion transmitting action when link members 28 rotate in a clockwise direction and the other of the cables 32 and 34 will effect the motion transmitting action when the link members 28 rotate in a counter-clockwise direction. In addition, one cable 32 and 34 is always located on link member 24 so as to restrict movement of the front link members 24 if and when the mower should be tipped up with its front wheels 14 leaving the ground. As shown in the drawings, this function is furnished by the upper cable since a downward movement of wheels 14 could cause a pivoting motion of link member 24 about axle 30. This pivoting motion is not allowed by the upper cable since the upper cable would have to get longer to allow such motion and the length of the cable is fixed. Thus, even when lawn mower 2 is tipped, front wheels 14 do not lose their selected height of cut adjustment.

Use of flexible cables 32 and 34 is preferred since it allows the cables to follow along the sides of housing 4 while not restricting the shape or configuration of the housing. Moreover, an adjustment for angle or inclination of housing 4 can easily be provided simply by shifting the one end of the outer sheath 36 which is connected to nut adjuster 52. This causes the configuration of the outer sheath 36 to change between the front and rear clamping means 42. For example, the nut adjuster 52 can be turned so as to draw more of the outer sheath 36 out of the rear clamping means 42. This causes a slight bend, or more of a bend, to be placed into sheath 36 between the front and rear clamping means 42 since the distance between them is fixed. Since the inner line 37 is forced to follow the outer sheath 36, this will also put a bend in that line 37. This effectively shortens the length of the inner line 37 and causes the front link members 24 to rotate relative to the rear link members 28. This changes the angle of inclination of housing 4 relative to the ground surface. Accordingly, all that is required to effect such an angle adjustment is to rotate the nut adjuster 52.

Various modifications of this invention will be apparent to those skilled in the art. For example, handle 58 used to push lawn mower 2 could have any form. Thus, the scope of this invention is to be limited only by the appended claims.

We claim:

1. An improved lawn mower for cutting grass or other vegetation, which comprises:
   (a) a housing having front and rear sides;
   (b) a plurality of rotatable front and rear ground engaging wheels, wherein each wheel is carried adjacent one corner of the housing for rollably supporting the housing for movement over a ground surface;
   (c) means carried on the housing for cutting vegetation at a pre-determined height above the ground; and
   (d) means for adjusting the pre-determined height of cut wherein the height of cut adjusting means comprises:
      (i) a link member rotatably carried on the housing adjacent each corner thereof for rotation about an axis of rotation fixed relative to the housing;
      (ii) means for rotatably coupling the link members adjacent the front side of the housing in a first pair and the link members adjacent the rear side of the housing in a second pair for joint rotation of the link members in each pair;
      (iii) means for rotatably supporting each of the wheels on one of the link members eccentrically offset from the axis of rotation of the link member such that rotation of the link member varies the position of the attached ground engaging wheel with respect to the housing for varying the height of the housing above the ground surface, whereby the height of cut is varied;
      (iv) means for rotating a selected one of the link members about its axis of rotation; and
      (v) means for transmitting rotation from the first to the second pair of link members so that rotation of the selected one link member effects simultaneous rotation of all the link members, wherein the motion transmitting means comprises two flexible cables extending between and attached to one of the link members in the first pair and one of the link members in the second pair.

2. An improved lawn mower as recited in claim 1, wherein the cables are attached at each end to the link members on opposite sides of a line extending between the axis of rotation of the link member and the point of support of the wheel on the link member, whereby first one cable and then the other cable effects the motion transmission between the first and second pairs of link members as the selected link member rotates clockwise and counter-clockwise, respectively, relative to the housing.

3. An improved lawn mower as recited in claim 2, wherein the cables are sufficiently tight and are located relative to one another and the link members in each position of the link members such that at least one cable resists rotation of the first pair of link members when the front wheels are raised off the ground by tipping the housing upwardly at the rear side thereof, whereby the front wheels will not fall downwardly when they are raised off the ground.

4. An improved lawn mower as recited in claim 1, wherein the housing includes left and right sides connecting the front and rear sides, and wherein the cables run along either the left or right sides of the housing below a top deck portion of the housing.

5. An improved lawn mower as recited in claims 1 or 4, wherein each of the cables comprises an outer sheath and an inner line slidable relative to one another, whereby the outer sheath contains and protects the inner line.

6. An improved lawn mower as recited in claim 1, further including means for adjusting the angular position of one pair of link members relative to the angular position of the other pair of link members for adjusting the tilt of the housing relative to the ground surface.

7. An improved lawn mower as recited in claim 6, wherein the angle adjusting means comprises a means for adjusting the length of one of the cables relative to the other to effect rotation of one pair of link members relative to the other pair of link members.

8. An improved lawn mower as recited in claim 7, wherein each cable includes an outer sheath and an inner line contained and slidable inside the outer sheath, wherein the inner lines of each cable are pivotally attached at either end to the link members to which the cables are secured, and further including means for clamping each end of each of the outer sheaths relative to the housing, and wherein one of the outer sheaths has means for adjusting the position of one of its ends in the clamping means such that the configuration of the outer sheath between the clamping means can be varied to increase or decrease the length of the inner line to effect the tilt adjustment of the housing.

9. An improved lawn mower as recited in claim 1, wherein the lawn mower includes a handle for use by a standing operator pushing the lawn mower housing, and further including a selectively operable control placed on the handle adjacent the operator for rotating the selected one link member about its axis of rotation, and further including a flexible control cable for connecting the control to the selected one link member.

10. A lawn mower as recited in claim 9, wherein the control cable has an outer sheath and a slidable inner line.

* * * * *